United States Patent
Bauerle et al.

(10) Patent No.: US 7,555,368 B2
(45) Date of Patent: Jun. 30, 2009

(54) SYNTHESIZED CONTROL INPUT

(75) Inventors: Paul A. Bauerle, Fenton, MI (US);
James L. Worthing, Munith, MI (US);
Joseph M. Stempnik, Warren, MI (US);
Daniel G. Bolstrum, West Bloomfield, MI (US)

(73) Assignee: GM Global Technology Operations, Inc., Detroit, MI (US)

(*) Notice: Subject to any disclaimer, the term of this patent is extended or adjusted under 35 U.S.C. 154(b) by 526 days.

(21) Appl. No.: 11/459,424

(22) Filed: Jul. 24, 2006

(65) Prior Publication Data
US 2008/0021599 A1 Jan. 24, 2008

(51) Int. Cl.
*G06F 17/00* (2006.01)
*G06F 19/00* (2006.01)

(52) U.S. Cl. ............................ 701/1; 701/56; 701/91; 701/93; 477/107

(58) Field of Classification Search .............. 701/1, 701/36, 51, 55, 56, 61, 84, 87, 90, 91, 93, 701/95, 101, 109; 477/107; 123/350, 436, 123/406, 492
See application file for complete search history.

(56) References Cited

U.S. PATENT DOCUMENTS

| 4,255,789 A * | 3/1981 | Hartford et al. ............. 701/108 |
| 6,775,608 B2 * | 8/2004 | Yasui ......................... 701/109 |
| 2006/0014608 A1 * | 1/2006 | Mitchell et al. ............. 477/107 |

FOREIGN PATENT DOCUMENTS

| DE | 10115052 | 10/2001 |
| DE | 10138620 | 3/2003 |
| DE | 10227719 | 1/2004 |

* cited by examiner

*Primary Examiner*—Tan Q Nguyen

(57) ABSTRACT

A control system for regulating operation of a first vehicle system includes first and second sensors that respectively monitor first and second operating parameters of a plurality of operating parameters, and a module that receives signals generated by the first and second sensors. The module accesses a look-up table that is normally provided to determine a first one of the plurality of operating parameters based on a second one of the plurality of operating parameters and an actual value of an input parameter. The module determines a virtual value of the input parameter while the actual value of the input parameter is equal to zero. At least one of the first and second vehicle systems is normally regulated based on the input parameter. The module regulates operation of the first vehicle system based on the virtual value of the input parameter.

19 Claims, 4 Drawing Sheets

SYNTHESIZED CONTROL INPUT

FIELD OF THE INVENTION

The present disclosure relates to vehicle control systems, and more particularly to synthesizing a control input for a vehicle control system.

BACKGROUND OF THE INVENTION

The statements in this section merely provide background information related to the present disclosure and may not constitute prior art.

Vehicles include a plurality of vehicle systems that operate in concert to propel the vehicle in accordance with a vehicle operator input An exemplary first vehicle system includes a transmission that is regulated based on vehicle operating parameters, vehicle speed, for example, as well as at least one control input (e.g., accelerator pedal position). An exemplary second vehicle system includes an engine that generates drive torque by combusting a fuel and air mixture.

In some instances, the first vehicle system is regulated based on an alternative control logic, whereby the actual control input is zero. For example, a transmission gear ratio is determined based on an accelerator pedal position during a normal operating mode. During a cruise control mode, the accelerator pedal position is zero, because the vehicle operator is not providing any control input. In order to properly operate the first vehicle system, an estimated control input is determined Traditional vehicle systems are pre-programmed with alternative control routines to provide a control input estimate during operating modes where the actual control input is zero. More specifically, traditional vehicle systems include additional look-up tables, for example, that are accessed during the alternative operating mode (e.g., cruise control) to regulate operation of the first vehicle system. Such additional tables are undesired because they require development time and cost to calibrate and program, in addition to requiring additional non-volatile memory capacity.

SUMMARY OF THE INVENTION

Accordingly, the present invention provides a control system for regulating operation of a first vehicle system. The control system includes first and second sensors that respectively monitor first and second operating parameters of a plurality of operating parameters, and a module that receives signals generated by the first and second sensors. The module accesses a look-up table that is normally provided to determine a first one of the plurality of operating parameters based on a second one of the plurality of operating parameters and an actual value of an input parameter. The module determines a virtual value of the input parameter while the actual value of the input parameter is equal to zero. At least one of the first and second vehicle systems is normally regulated based on the input parameter. The module regulates operation of the first vehicle system based on the virtual value of the input parameter.

In another feature, the module regulates operation by determining a second input parameter based on the virtual value of the input parameter. The first vehicle system is regulated based on the second input parameter.

In another feature, the input parameter is a pedal position.

In another feature, the second vehicle system is an engine system, and the plurality of operating parameters includes an engine speed and a throttle position.

In still another feature, the first vehicle system is a transmission. A gear ratio of the transmission is determined based on the virtual value.

In yet another feature, the module determines the virtual value by interpolating the virtual value from the look-up table.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION OF THE PREFERRED EMBODIMENTS

Figure 1:
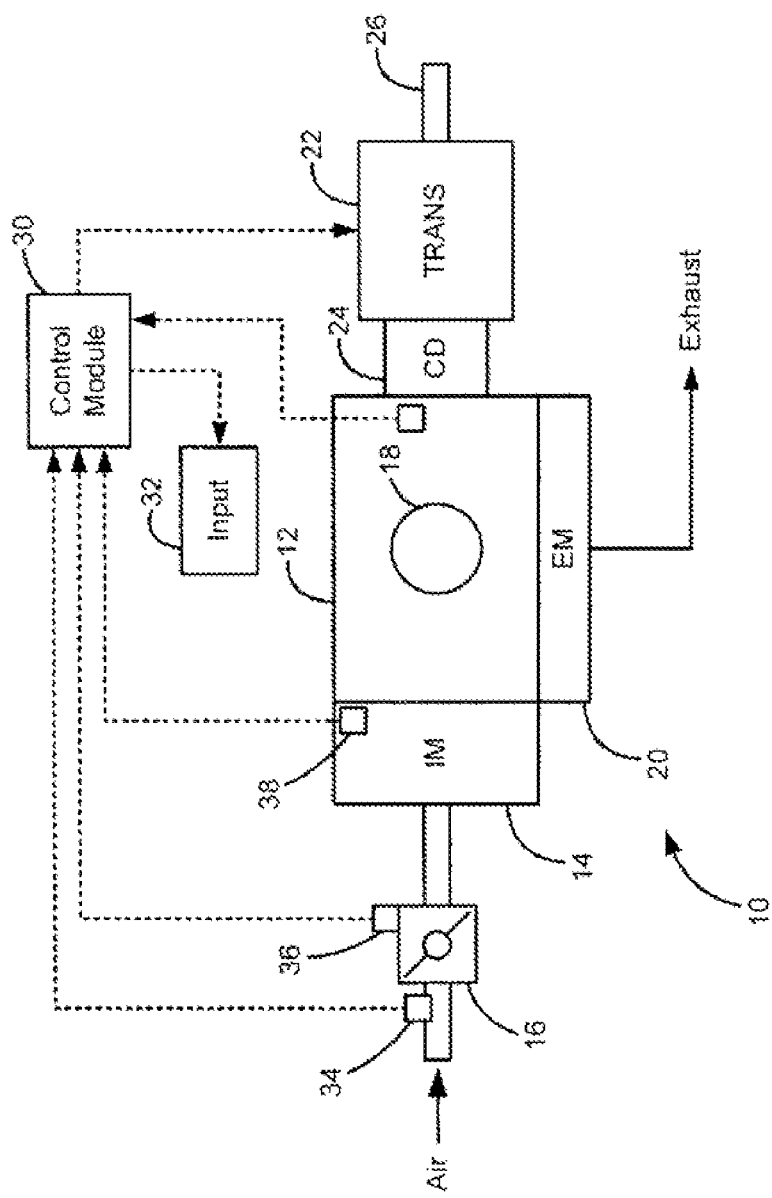
FIG. 1 is a functional block diagram of an exemplary vehicle system that implements the synthesized control input control of the present invention.

The following description of the preferred embodiment is merely exemplary in nature and is in no way intended to limit the invention, its application, or uses. For purposes of clarity, the same reference numbers will be used in the drawings to identify similar elements. As used herein, the term module refers to an application specific integrated circuit (ASIC), an electronic circuit, a processor (shared, dedicated, or group) and memory that execute one or more software or firmware programs, a combinational logic circuit, or other suitable components that provide the described functionality.

Referring now to FIG. 1, an exemplary vehicle system 10 includes an engine 12 that generates drive torque. More specifically, air is drawn into an intake manifold 14 through a throttle 16. The air is mixed with fuel, and the fuel and air mixture is combusted within a cylinder 18 to reciprocally drive a piston (not shown), which rotatably drives a crankshaft (not shown). Exhaust, resulting from the combustion process, is exhausted through an exhaust manifold 20, is treated in an after-treatment system (not shown) and is released to atmosphere.

The crankshaft drives a transmission 22 through a coupling device 24. In the case of the transmission 22 being an automatic transmission, the coupling device 24 is provided as a torque converter. In the case of the transmission 22 being a manual transmission or an automated manual transmission, the coupling device 24 is provided as a clutch or an electronically controlled clutch (ECC). The transmission 22 includes an input shaft (not shown) and an output shaft 26, which transmits drive torque through a driveline (not shown) to rotatably drive a wheel or wheels.

A control module 30 regulates overall operation of the vehicle system 10 based on the synthesized control input control of the present invention. More specifically, the control module 30 receives vehicle operating parameter signals from a plurality of sensors and a control input 32 that includes, but is not limited to, an accelerator pedal position. Exemplary sensors include a mass air flow (MAF) sensor 34, a throttle position sensor 36: a manifold absolute pressure (MAP) sensor 38 and an engine RPM sensor 40.

Figure 2:
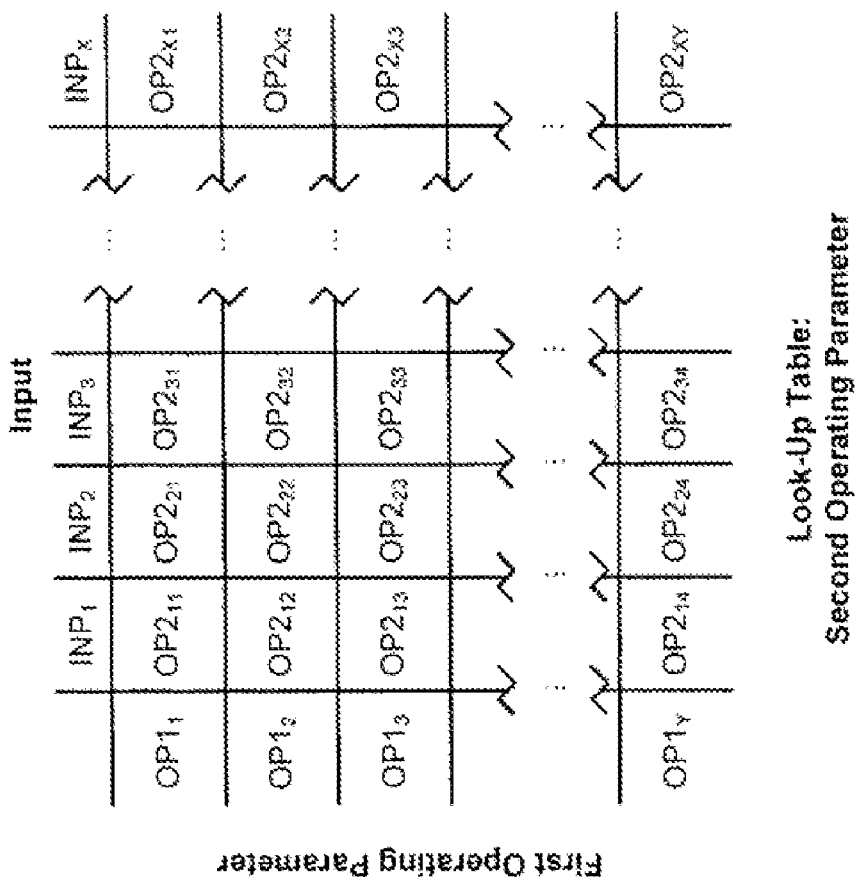
FIG. 2 is an exemplary look-up table to determine a second operating parameter value based on a control input value and a first operating parameter value.

The synthesized control input control of the present invention monitors operation of first and second vehicle systems, and determines a synthesized value of a control input to the second vehicle system that is used to regulate operation of the first vehicle system. More specifically the synthesized control input control of the present invention implements a pre-programmed look-up table that is normally used to determine the value of a second operating parameter (OP2) based on a first operating parameter (OP1) and an actual input (INP). For example, FIG. 2 illustrates an exemplary table that is normally implemented to determine OP2 based on INP and OP1. An exemplary table includes a table that is used to determine an effective throttle area ($A_{THR}$) (i.e., OP2) based on an accelerator pedal position ($P_{PED}$) (i.e., INP) and a vehicle speed ($V_{VEH}$).

The synthesized control input control of the present invention determines a synthesized input ($INP_{SYN}$) based on OP1 and OP2. More specifically, the synthesized control input control reverse interpolates $INP_{SYN}$ using the above-described table. For example, the engine 12 can be defined as the second vehicle system, with OP1 and OP2 being provided as $V_{VEH}$ and $A_{THR}$, respectively. When operating in a cruise control mode, $V_{VEH}$ and $A_{THR}$, are known but $P_{PED}$ is zero. That is to say, because the control module 30 automatically regulates the throttle position during cruise control there is no driver induced movement of the accelerator pedal (i.e., there is no actual control input).

It is desirable to determine what the actual input value to the second vehicle system would be given the current vehicle operating conditions. To that end, the synthesized control input control of the present invention determines $INP_{SYN}$. In this manner the first vehicle system can be operated based on $INP_{SYN}$ using the normal control logic and/or look-up tables. More specifically, by determining $INP_{SYN}$, the present invention eliminates the need to develop alternative control logic and/or look-up tables for the condition where the is no actual control input, as is the case for controlling shifting in an automatic transmission during operation in cruise control, for example.

Figure 3:
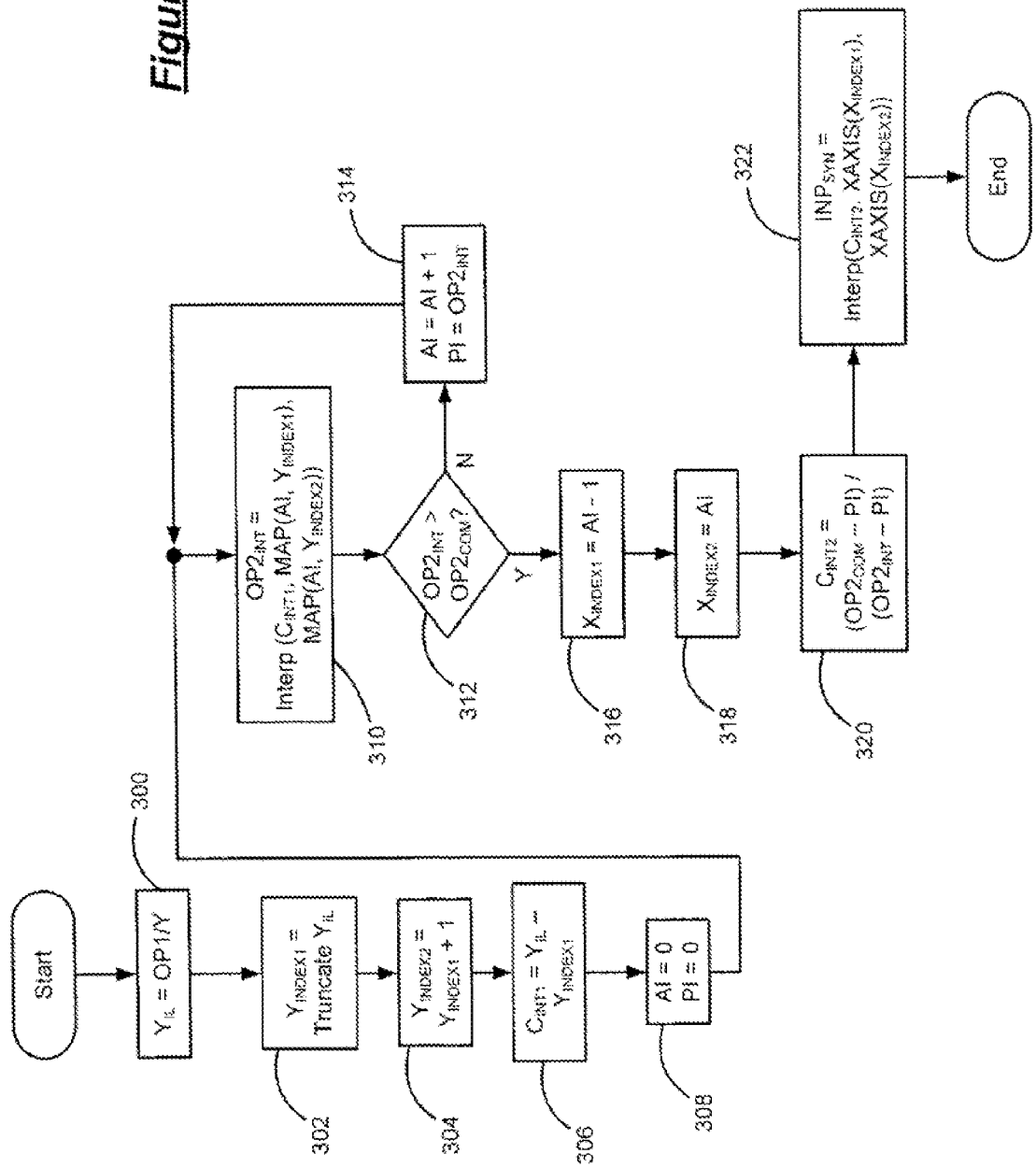
FIG. 3 is a flowchart illustrating exemplary steps that are executed by the synthesized control input control of the present invention.

Referring now to FIG. 3, exemplary steps that are executed by the synthesized control input control of the present invention will be described. In step 300, control determines a Y-axis index location (YIL) of the above-described look-up table based on OP1 (e.g. $V_{VEH}$) and a size Y of the Y-axis (Y). In step 302 control determines a first Y index ($Y_{INDEX1}$) by truncating $Y_{IL}$. That is to say. $Y_{INDEX1}$ is determined as the whole value of $Y_{IL}$, by subtracting a decimal value. A second Y index ($Y_{INDEX2}$) is determined by adding 1 to $Y_{INDEX1}$. $Y_{INDEX1}$ and $Y_{INDEX2}$ are the Y columns that bound the value of OP1 (e.g., $V_{VEH}$).

In step 306, control determines a first interpolation coefficient ($C_{INT1}$) as the difference between $Y_{IL}$ and $Y_{INDEX1}$. In general $C_{INT1}$ is provided as the decimal portion of $Y_{IL}$. Control sets an array index variable (AI) and a previous interpolation (PI) variable equal to zero in step 308. In step 310, control determines an interpolated OP2 value ($OP2_{INT}$) based on $C_{INT1}$, AI, $Y_{INDEX1}$ and $Y_{INDEX2}$. $OP2_{INT}$ is determined based on the following relationship:

$$OP2_{INT} = C_{INT1}(UV - LV) + LV$$

where UV and LV correspond to upper and lower values respectively., that are determined by mapping the table based on the current AI and $Y_{INDEX1}$ for UV, and the current AI and $Y_{INDEX2}$ for LV.

In step 312, control determines whether $OP2_{INT}$ exceeds the currently commanded OP2 value ($OP2_{COM}$) (e.g., $A_{THR}$). If $OP2_{INT}$ is not greater than $OP2_{COM}$, control increments AI and sets PI equal to $OP2_{INT}$ in step 314: and control loops back to step 310. If $OP2_{INT}$ is greater than $OP2_{COM}$, control determines a first X-axis index ($X_{INDEX1}$) by subtracting 1 from AI in step 316. A second X-axis index ($X_{INDEX2}$) is set equal to AI in step 318. In step 320, control determines a second interpolation coefficient ($C_{INT2}$) as the ratio of a difference between $OP2_{COM}$ and PI to a difference between $OP2_{INT}$ and PI, Control determines $INP_{SYN}$ in step 322 and control ends. $INP_{SYN}$ is determined based on the following relationship:

$$INP_{SYN} = C_{INT2}(X_{INDEX2} - X_{INDEX1}) + X_{INDEX1}$$

Control uses $INP_{SYN}$ to regulate operation of the first vehicle system. For example, in the case where the first vehicle system is an automatic transmission, and $INP_{SYN}$ is a synthesized pedal position, a gear ratio of the transmission is determined based on $INP_{SYN}$.

Figure 4:
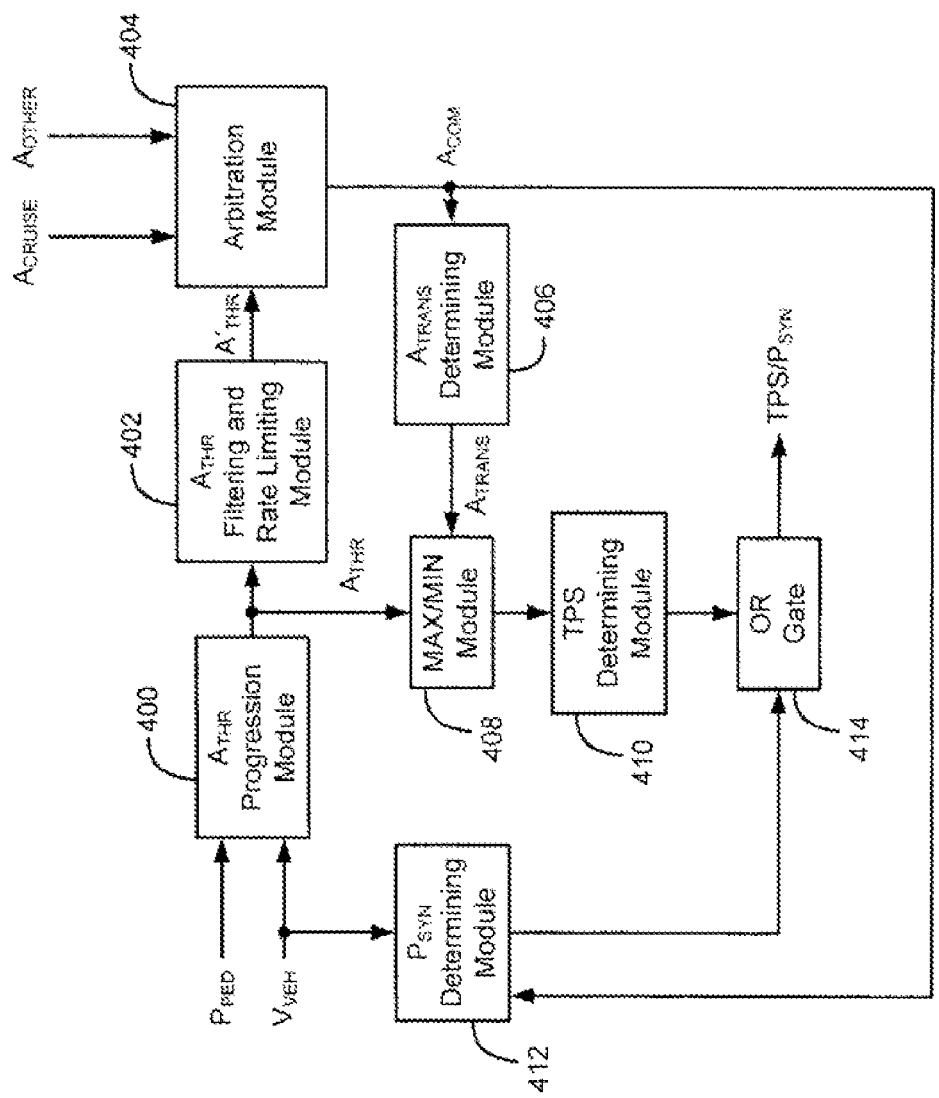
FIG. 4 is a functional block diagram of exemplary modules that regulate a second vehicle system based on a control input and an operating parameter of a first vehicle system.

Referring now to FIG. 4, exemplary modules that regulate a second vehicle system (e.g. transmission system) based on OP1 and OP2 of a first vehicle system (e.g., engine system) will be described in detail. The exemplary modules include an $A_{THR}$ progression module 400, an ATHR filtering and rate limiting module 402, an arbitration module 404, a transmission throttle area ($A_{TRANS}$) determining module 406, a MAX/MIN module 408, a throttle position (TPS) determining module 410, a $P_{SYN}$ determining module 412 and an OR gate 414.

The $A_{THR}$ progression module determines $A_{THR}$ by using $P_{PED}$ and $V_{VEH}$ as input values into a look-up table. As discussed above, $P_{PED}$ is generally equal to zero during cruise control, although a vehicle operator may step into the accelerator pedal during cruise control. $A_{THR}$ is output to the $A_{THR}$ filtering and rate limiting module 402 and the MAX/MIN module 408. The $A_{THR}$ filtering and rate limiting module 402 determines a filtered and/or rate limited $A_{THR}$ ($A'_{THR}$). $A_{THR}$ is filtered to inhibit oscillation of the throttle 18 and is rate limited to prevent the throttle 18 from opening/closing too rapidly. The arbitration module 404 arbitrates between $A'_{THR}$, a commanded cruise control throttle area ($A_{CRUISE}$) and a throttle area request generated by other control systems (e.g., a vehicle stability control system) ($A_{OTHER}$). In general, the arbitration module 404 passes the highest throttle area value for a properly functioning system. The throttle area is output as a commanded throttle area ($A_{COM}$).

The $A_{TRANS}$ module 406 determines $A_{TRANS}$ by subtracting an idle throttle area ($A_{IDLE}$) from the throttle area that is output by the arbitration module 404. The MAX/MIN module 408 outputs one of $A_{THR}$ and $A_{TRANS}$ to the TPS determining module 410. More specifically, if the throttle area is increasing the MAX/MIN module 408 outputs the maximum of $A_{THR}$ and $A_{TRANS}$. If the throttle area is decreasing, the MAX/MIN module 408 outputs the minimum of $A_{THR}$ and $A_{TRANS}$ to remove any rate limiting and/or filtering from $A_{TRANS}$. The TPS determining module 410 determines a throttle position based on the output of the MAX/MIN module 408.

The $P_{SYN}$ determining module 412 executes the synthesized control input control of the present invention to provide $P_{SYN}$. More specifically, the $P_{SYN}$ determining module accesses the same look-up table as the $A_{THR}$ progression module, and executes a reverse look-up to determine $P_{SYN}$ based on $V_{VEH}$ and $A_{COM}$. The OR gate 414 outputs one of $P_{SYN}$ and TPS. More specifically, the output of the OR gate 414 is based on a calibration.

Those skilled in the art can now appreciate from the foregoing description that the broad teachings of the present invention can be implemented in a variety of forms. Therefore while this invention has been described in connection with particular examples thereof the true scope of the invention should not be so limited since other modifications will become apparent to the skilled practitioner upon a study of the drawings, the specification and the following claims.

What is claimed is:

1. A control system for regulating operation of a first vehicle system, comprising:
    first and second sensors that respectively monitor first and second operating parameters of a plurality of operating parameters; and
    a module that receives signals generated by said first and second sensors that accesses a lookup table that is normally provided to determine a first one of said plurality of operating parameters based on a second one of said plurality of operating parameters and an actual value of an input parameter, that determines a virtual value of said input parameter while said actual value of said input parameter is equal to zero, wherein at least one of said first and second vehicle systems is normally regulated based on said input parameter, and that regulates operation of said first vehicle system based on said virtual value of said input parameter.

2. The control system of claim 1 wherein said module regulates operation by determining a second input parameter based on said virtual value of said input parameter, wherein said first vehicle system is regulated based on said second input parameter.

3. The control system of claim 1 wherein said input parameter is a pedal position.

4. The control system of claim 1 wherein said second vehicle system is an engine system, and said plurality of operating parameters include an engine speed and a throttle position.

5. The control system of claim 1 wherein said first vehicle system is a transmission, and wherein a gear ratio of said transmission is determined based on said virtual value.

6. The control system of claim 1 wherein said module determines said virtual value by interpolating said virtual value from said look-up table.

7. A method of regulating operation of a first vehicle system, comprising:
    determining respective values of a plurality of operating parameters of a second vehicle system;
    providing a look-up table to determine a first one of said plurality of operating parameters based on a second one of said plurality of operating parameters and an actual value of an input parameter;
    determining a virtual value of said input parameter while said actual value of said input parameter is equal to zero, wherein at least one of said first and second vehicle systems is normally regulated based on said input parameter; and
    regulating operation of said first vehicle system based on said virtual value of said input parameter.

8. The method of claim 7 wherein said regulating operation includes determining a second input parameter based on said virtual value of said input parameter, wherein said first vehicle system is regulated based on said second input parameter.

9. The method of claim 7 wherein said input parameter is a pedal position.

10. The method of claim 7 wherein said second vehicle system is an engine system, and said plurality of operating parameters include an engine speed and a throttle position.

11. The method of claim 7 wherein said first vehicle system is a transmission, and wherein a gear ratio of said transmission is determined based on said virtual value.

12. The method of claim 7 wherein said determining said virtual value includes interpolating said virtual value from said look-up table.

13. A method of regulating operation of a first vehicle system, comprising:
    determining respective values of a plurality of operating parameters of a second vehicle system;
    operating said second vehicle system in one of a first mode and a second mode;
    determining a virtual value of an input parameter to said second vehicle system when operating in said first mode;
    regulating operation of said first vehicle system based on said virtual value of said input parameter while said second vehicle system is operating in said first mode; and
    regulating operation of said first vehicle system based on an actual value of said input parameter while said second vehicle system is operating in said second mode.

14. The method of claim 13 wherein said first mode is a cruise mode.

15. The method of claim 13 wherein said input parameter is a pedal position.

16. The method of claim 13 wherein said second vehicle system is an engine system, and said plurality of operating parameters include an engine speed and a throttle position.

17. The method of claim 13 wherein said first vehicle system is a transmission, and wherein a gear ratio of said transmission is determined based on said virtual value.

18. The method of claim 13 wherein said determining said virtual value includes interpolating said virtual value from a relationship based on said plurality of operating parameters.

19. The method of claim 18 further comprising providing said relationship as a look-up table that is used to determine a first one of said plurality of operating parameters based on a second one of said plurality of operating parameters and said actual value of said input parameter.

* * * * *